United States Patent
Rogers et al.

(10) Patent No.: US 7,979,626 B2
(45) Date of Patent: Jul. 12, 2011

(54) FLASH RECOVERY EMPLOYING TRANSACTION LOG

(75) Inventors: Andrew M. Rogers, Bellevue, WA (US); Sachin Patel, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 657 days.

(21) Appl. No.: 12/119,576

(22) Filed: May 13, 2008

(65) Prior Publication Data

US 2009/0287874 A1    Nov. 19, 2009

(51) Int. Cl.
*G06F 12/00* (2006.01)

(52) U.S. Cl. ......................................... 711/103

(58) Field of Classification Search .................. None
See application file for complete search history.

(56) References Cited

U.S. PATENT DOCUMENTS

| | | | |
|---|---|---|---|
| 6,728,879 B1 | 4/2004 | Atkinson | 713/168 |
| 6,959,401 B2 | 10/2005 | Lomet et al. | 714/16 |
| 7,093,162 B2 | 8/2006 | Barga et al. | 714/15 |
| 7,139,883 B2 | 11/2006 | Aasheim et al. | 711/156 |
| 7,178,050 B2 | 2/2007 | Fung et al. | 714/4 |
| 7,340,647 B2 | 3/2008 | Aasheim et al. | 714/24 |
| 2002/0184436 A1 | 12/2002 | Kim et al. | 711/103 |
| 2003/0163632 A1 | 8/2003 | Aasheim et al. | 711/103 |
| 2006/0168474 A1 | 7/2006 | Aasheim et al. | 714/24 |
| 2007/0005664 A1 | 1/2007 | Kodavalla et al. | 707/202 |
| 2007/0174541 A1 | 7/2007 | Chandrasekaran et al. | 711/100 |
| 2007/0192373 A1 | 8/2007 | Lomet | 707/200 |
| 2007/0300009 A1 | 12/2007 | Rogers et al. | 711/103 |
| 2008/0033964 A1 | 2/2008 | Richards et al. | 707/10 |
| 2008/0235298 A1 * | 9/2008 | Lin et al. | 707/202 |
| 2008/0294648 A1 * | 11/2008 | Lin et al. | 707/10 |
| 2009/0024851 A1 * | 1/2009 | Andrade | 713/176 |

OTHER PUBLICATIONS

International Search Report issued Aug. 21, 2009 in connection with PCT/US2009/040403.
ELF: An Efficient Log-Structured Flash File System for Micro Sensor Nodes http://www.cs.colorado.edu/~rhan/Papers/sensys_elf_external.pdf.
Exchange Recovery Services Forum Index http://www.exchangerecovery.org/modules.php?name=Forums&file=viewtopic&t=25.
FAT and NTFS Data Recovery Information http://www.buzzle.com/articles/fat-and-ntfs-data-recovery-information.html.

* cited by examiner

*Primary Examiner* — Hiep T Nguyen
(74) *Attorney, Agent, or Firm* — Merchant & Gould, P.C.

(57) ABSTRACT

A transaction log for flash recovery includes a chained sequence of blocks specifying the operations that have been performed, such as a write to a sector or an erase to a block. Checkpoints are performed writing the entire flash state to flash. Once a checkpoint is performed, all of the log entries prior to the checkpoint are deleted and the log processing on recovery begins with the latest checkpoint. If the system is able to safely shutdown, then a checkpoint may be performed before the driver unloads, and on initialization, the entire persisted flash state may be loaded into the flash memory with a minimal amount of flash scanning. If a power failure occurs during system operation, then on the next boot-up, only the sectors or blocks specified in the log entries after the latest checkpoint have to be scanned, rather than all the sectors on the part.

20 Claims, 7 Drawing Sheets

FLASH RECOVERY EMPLOYING TRANSACTION LOG

BACKGROUND

Flash memory is non-volatile computer memory that can be electrically erased and reprogrammed. The technology is primarily used in memory cards and Universal Serial Bus "USB" flash drives for general storage and transfer of data between computers and other digital products. Flash memory is a specific type of Electrically Erasable Programmable Read-Only Memory "EEPROM" that is erased and programmed in large blocks. Flash memory costs significantly less than byte-programmable EEPROMs and has, therefore, become the dominant technology wherever a significant amount of non-volatile, solid-state storage is needed. Examples of applications include Personal Digital Assistants "PDAs" laptop computers, digital audio/video players, digital cameras, game consoles, and mobile phones.

Flash memory is non-volatile, meaning that it does not need power to maintain the information stored in the chip. In addition, flash memory offers relatively fast read access times (although not as fast as volatile DRAM memory used for main memory in PCs) and better kinetic shock resistance than hard disks. These characteristics lead to the popularity of flash memory in portable devices. Another feature of flash memory is that when packaged in a memory card, it is very durable, being able to withstand intense pressure, extremes of temperature, and even immersion in water.

Currently available flash drivers typically require scanning every sector on the flash memory during boot-up to determine the state of the flash memory and to recover any interrupted operations due to a power failure. The flash state includes data structures such as the logical to physical sector mapping table, the free list, and the dirty list. However, as flash parts get larger, this process may take very long and, therefore, impact boot-up time.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to employing a transaction log for flash memory recovery after a shutdown. The transaction log may include a chained sequence of blocks specifying operations that have been performed prior to the shutdown. According to some embodiments, log entries are recorded and checkpoint(s) created during operation. The transaction log is located upon initialization and the log processed for recovery and handling of power failures during flash operation. According to other embodiments, the transaction log may be trimmed for reclaiming flash space.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, a transaction log with checkpoint(s) may be utilized to recover a flash memory. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
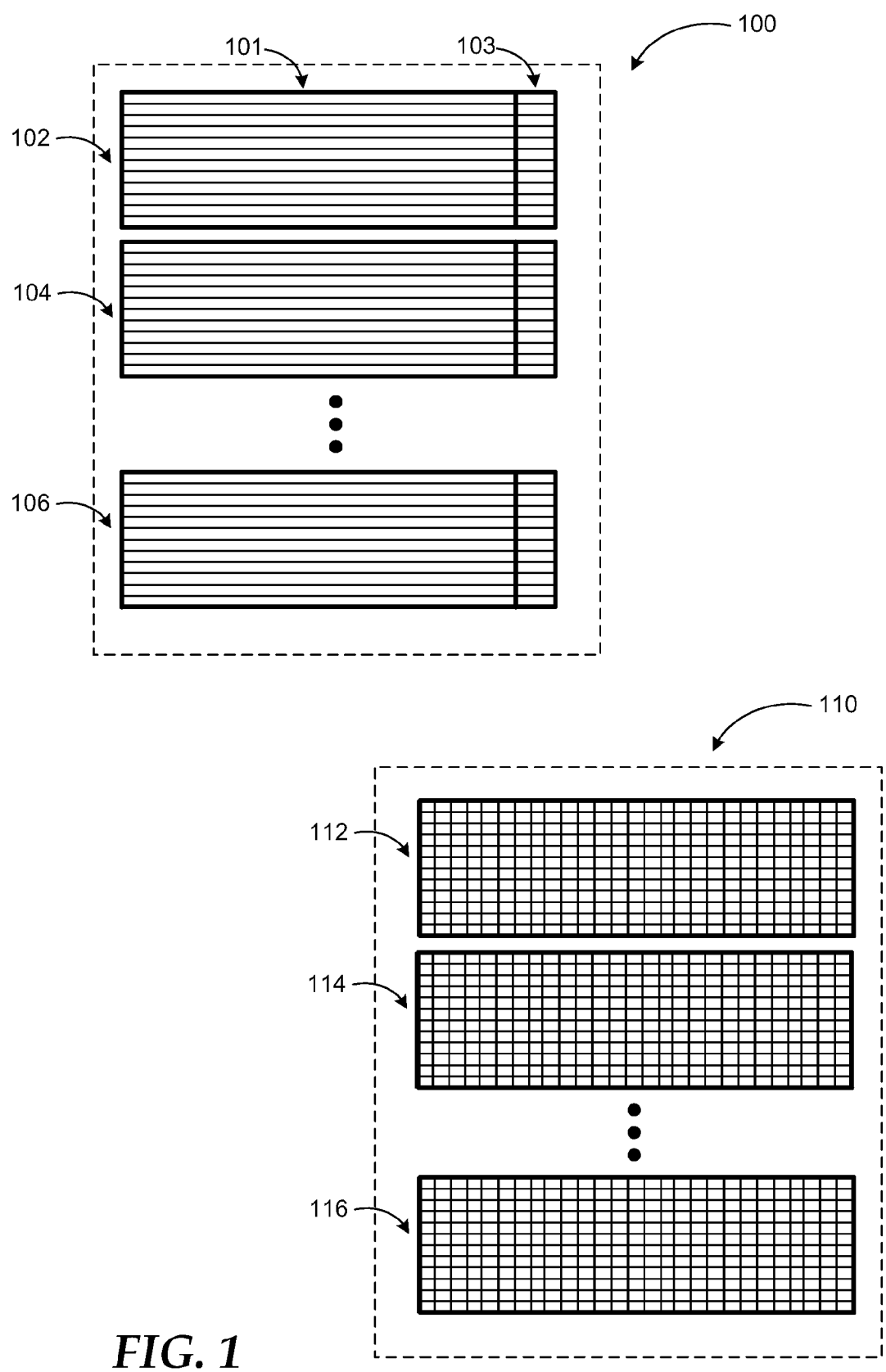
FIG. 1 is a diagram illustrating storage structures of different types of flash memories.

Referring to FIG. 1, diagrams 100 and 110 illustrating storage structures of different types of flash memories are provided. Two major types of flash memory are common: (1) NAND flash, where the media is divided into a collection of blocks further subdivided into pages (e.g. from the traditional 512 bytes in size to 2 KB in size for large-block NANDs); and (2) NOR flash, where the media is divided into a collection of blocks and all bytes are individually addressable (like RAM).

Diagram 100 illustrates a NAND flash memory divided into a series of contiguous blocks (102, 104, . . . , 106). Each block is then further subdivided into some number of pages (for example, 32 sectors per block is a common value for a 16 MB NAND flash device). Each page is then further divided into two distinct sections: Data area 101 (512 bytes on small block NAND, 2 KB on large block NAND) for storing information; and Extra area 103 (16 bytes on small block NAND, 64 bytes on large block NAND) for storing extra information such as Flash Abstraction Layer (FAL) metadata, Error Correction Code (ECC), and the like.

Diagram 110 illustrates a NOR flash memory divided into a series of contiguous blocks (112, 114, . . . , 116). Similar to conventional RAM, every byte in these blocks is individually addressable.

NAND flash is typically characterized by slower READ performance than NOR flash but faster WRITE performance than NOR flash. NOR flash memories typically have READ speeds comparable to RAM and allow for Execution-In-Place (XIP) of system code. NAND flash typically ships with BAD blocks on the media which cannot be used for storing data. As a result, the system software (a.k.a. device driver) is responsible for BAD block management. NAND flash is known for leakage currents in the oxide layer (Tox) of the floating gate. Practically, this means that it is possible for bits in a page to randomly change value over time. As a result, it is necessary to use ECC to detect and correct bit changes in the media. Furthermore, NOR flash typically has a much slower erase time than NAND flash and NAND flash memory density scales better due to the underlying transistor structure.

Multi-level Cell (MLC) flash stores 2 bits per cell, as opposed to 1 bit per cell with regular Single-level Cell (SLC) NAND flash. This allows twice the density of storage, but results in drawbacks. This technology affects the reliability of the part, which requires using a larger ECC to detect and correct bit changes. It may also present restrictions in the way the memory is programmed.

Large block NAND has essentially a larger page size (e.g. 2 KB), which gives it a larger block size as well. The larger page size also means that the spare area is larger too (e.g. 64 bytes for a 2 KB data page).

As mentioned above, MLC and large block NAND present restrictions in the way flash is programmed. For example, both MLC and large block NAND require pages to be programmed sequentially within a block. Once a page has been written and subsequent pages have been written, the original page cannot be re-written before the entire block is erased. Moreover, MLC imposes the additional restriction of limiting only one partial page program. This means that once a page has been written, it can no longer be written again without being erased. Large block NAND has the limitation of 3 partial page programs.

Both NAND and NOR flash memory also suffer from physical restraints such as: (1) WRITE operations can only set a bit from a logical '1' to a logical '0'; (2) ERASING a block sets all of the bits in the block to a logical '1'; (3) only blocks can be erased, and it is not possible to erase individual pages/bytes in a block without erasing all pages/bytes within the same block; (4) blocks have a limited ERASE lifetime (100,000 to 1,000,000 cycles); and (5) READ operations do not count against the WRITE/ERASE lifetime. As a result of these characteristics, it is necessary to perform "wear-leveling" on the media so that the lifetime of the device is maximized. Additionally, a technique for effectively erasing blocks without losing data needs to be used. Considering that the target for flash memory is often battery-powered devices it may be necessary to safeguard against data loss during power-failure situations. NAND flash memory also requires ECC to safeguard against data corruption due to leakage currents.

Figure 2:
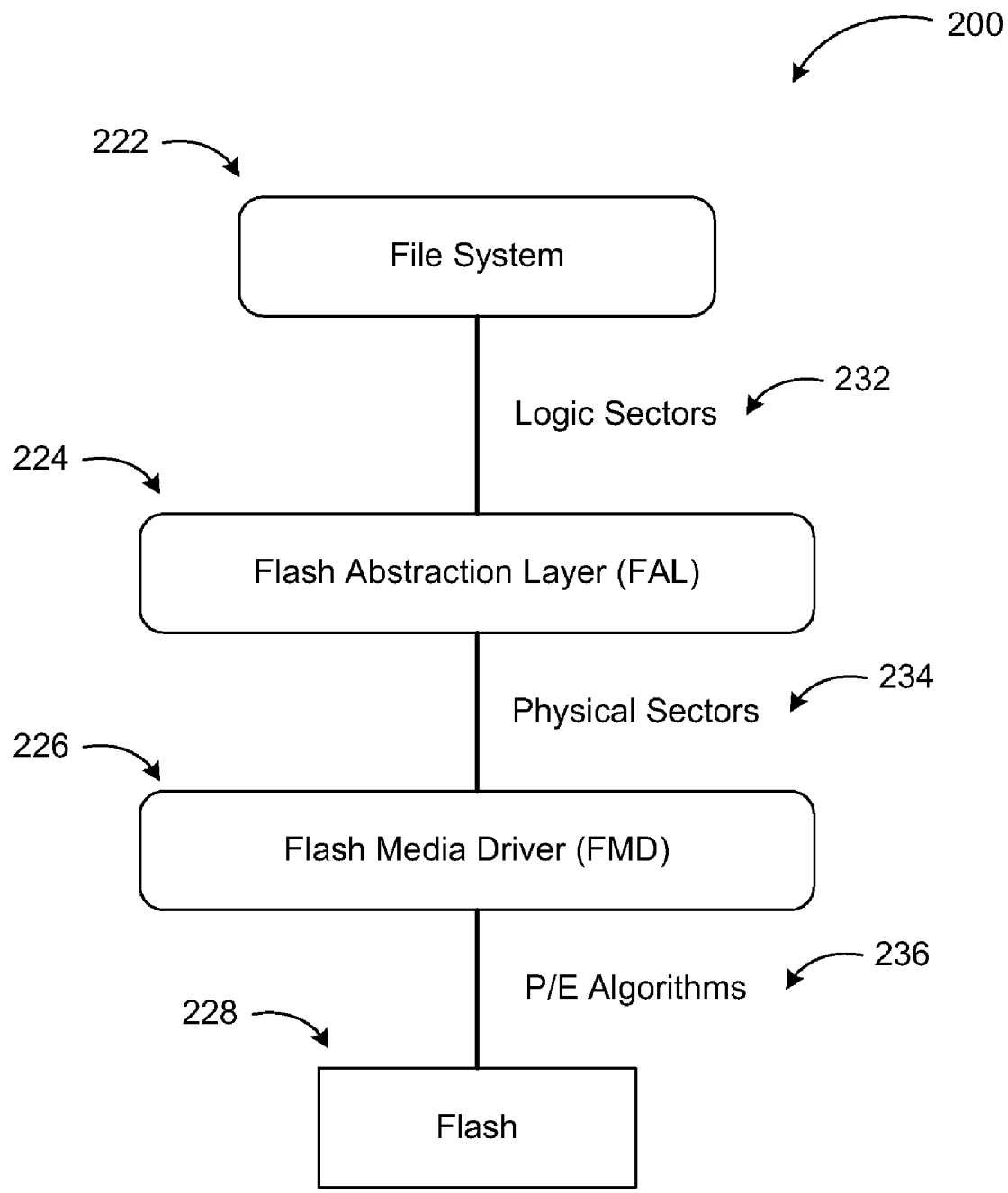
FIG. 2 is a conceptual diagram illustrating a high level architecture of a flash driver according to embodiments.

FIG. 2 is a conceptual diagram illustrating a high level architecture of a flash driver according to embodiments. In a computing device utilizing flash memory according to embodiments, file system 222 is over a "translation" layer known as the Flash Abstraction Layer (FAL) 224. FAL 224 is responsible for handling all I/O requests from the upper-level file system 222, implementing all of the necessary "wear-leveling" operations, maintaining data integrity, handling power-failure situations, and the like. It should be noted that the FAL 224 passes all of the actual READ/WRITE requests onto the Flash Media Driver (FMD) 226. The FMD 226 includes a set of entry points that are responsible for interacting with actual the flash hardware. FMD 226 is responsible for implementing the program/erase algorithms 236 necessary to READ/WRITE/ERASE the flash media 228.

Through the use of the FAL 224, the file system for use in the target device may be freely selected. Additionally, through the use of the FMD 226, the flash memory for use in the target device may also be freely chosen. Because the error correcting-code (ECC) codec is relegated to the FMD 226 layer in the abstraction chain, any ECC codec may be chosen to use with a memory device.

According to one embodiment, the FAL 224 may be broken down into the following components: (1) Main FAL Object—this component is responsible for handling the read/write to a particular flash region, as well as building up the logical to physical mapping during initialization; (2) Sector Manager—this component is responsible for managing the list of free and dirty sectors on the media, when prompted the Sector Manager may return the next free sector on the media (if available); (3) Mapping Table—the component is responsible for maintaining the logical to physical sector mapping (232 to 234), the file system uses logical sectors (232) that are then mapped to arbitrary physical sectors (234) on the media, as a result, the FAL translates all logical sector addresses from the file system into the corresponding physical sector addresses on the media; (4) Compactor—this component is responsible for recycling dirty sectors into free sectors, the compactor analyzes an entire flash block to determine which sectors are dirty and can be recycled, any sectors in a block that are not dirty are re-mapped to another portion of the media.

A transaction log in a system according to embodiments comprises a chained sequence of blocks which specify the operations that have been performed, such as a write to a sector or an erase to a block. Periodically, a checkpoint is performed, where the entire flash state is written out to flash. Once a checkpoint is performed, all of the log entries prior to the checkpoint may be deleted and the log processing on recovery begins with the latest checkpoint. If the system is able to safely shutdown, then a checkpoint may be performed before the driver unloads, and on initialization, the entire persisted flash state may be loaded into the flash memory with a minimal amount of flash scanning. If a power failure occurs during system operation, then on the next boot-up, only the sectors or blocks specified in the log entries after the latest checkpoint have to be scanned, rather than all the sectors on the part.

As mentioned above, the transaction log is stored on flash memory and includes a sequence of chained blocks. According to one embodiment, each block has a forward pointer to the next block in the chain and a backwards pointer to the previous block in the chain. Each sector within the block stores a single log entry. The four log entry types may be: write log entry, erase log entry, checkpoint log entry, and recover write log entry. The transaction log may be stored anywhere on flash and location of the log does not need to be pre-reserved to a specific set of blocks. This prevents the flash writes from being distributed unevenly on the part, which may cause the part to wear out quicker.

Each log block may be identified by a special bit in the spare area of the flash memory within each sector. In order to locate the log on initialization, each block may be scanned from the beginning of the flash memory until a block with the special log bit is found. Since the log is typically distributed well across the part and only a bit has to be examined for each block, the first physical log block can be found fairly quickly. Once the first physical log block is found, the rest of the log may be quickly located by following the forward and backward pointers. Once the location of the entire log has been recorded, the latest checkpoint may be found by starting at the end of the log and examining each of the log entries backwards until the first checkpoint is found (identified by another special bit in the spare area). Once the latest checkpoint is found, the log recovery may begin.

The flash memory structures and the architecture discussed in conjunction with FIG. 1 and FIG. 2 are for illustration purposes and do not constitute a limitation on embodiments. Various aspects of the present disclosure described herein may be implemented in flash memories of various structures employing variations of the architecture described in FIG. 2.

Figure 3:
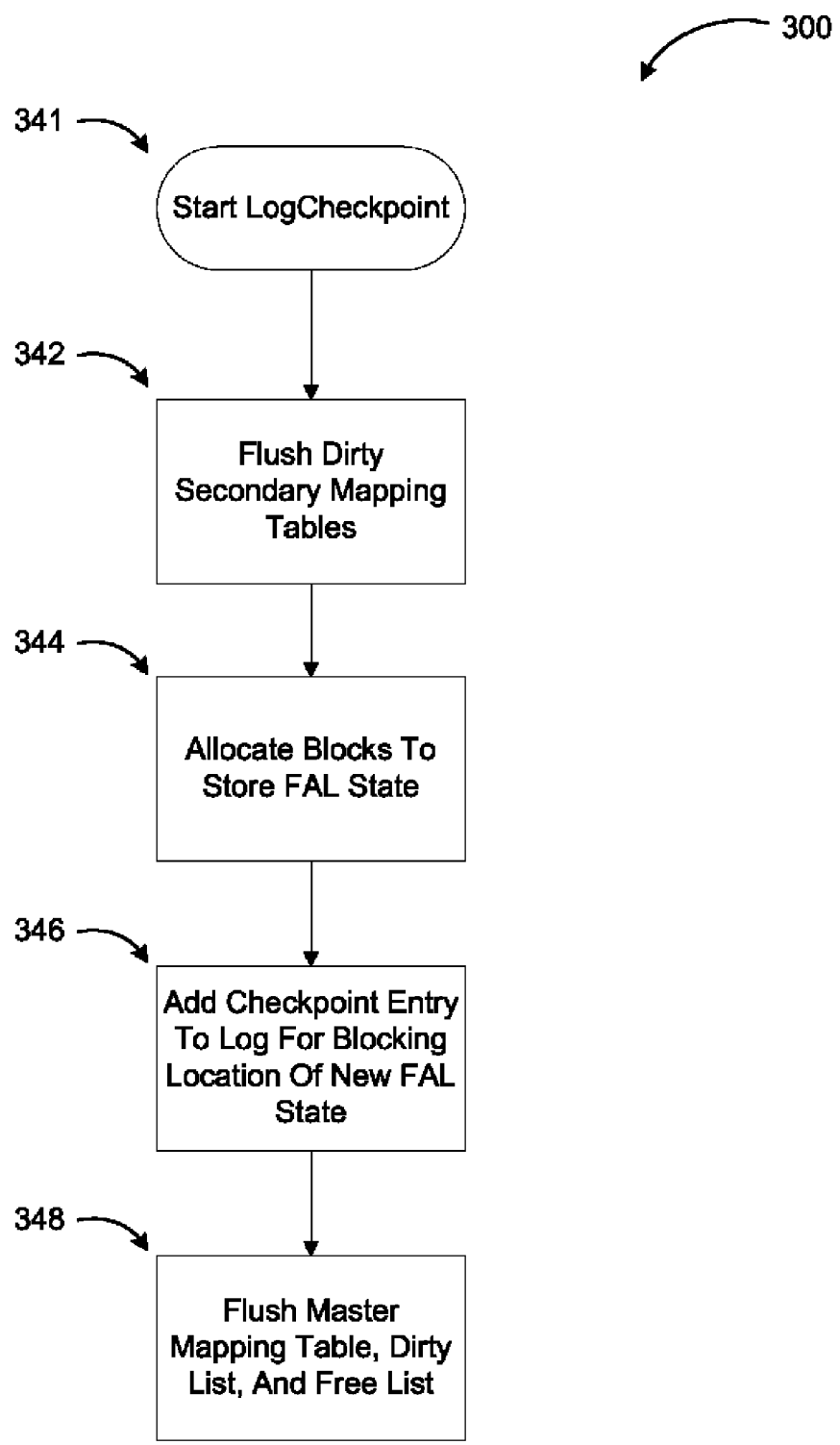
FIG. 3 illustrates an example checkpointing process in a flash driver according to embodiments.

FIG. 3 illustrates example checkpointing 300 process in a flash driver according to embodiments. Recording of log entries and checkpointing are intertwined processes. According to some embodiments, the first entry written to the log, when the log is first initialized, is a checkpoint entry.

The checkpoint involves persisting the entire driver state in RAM to flash memory. This state includes the mapping table, the dirty block list, and the free block list. One or more flash blocks may be allocated to store the current flash state and the checkpoint log entry includes a pointer to these flash blocks.

The process begins (341) with start log checkpoint step and moves to flushing of dirty secondary mapping tables (342). Following the flushing of the dirty secondary mapping tables, blocks are allocated to store the FAL state (344) as discussed above. Then, a checkpoint entry is added to the log for blocking the location of the new FAL state (346). Once the checkpoint entry is added, the master mapping table, the dirty block list, and the free block list may be flushed (348) preserving valuable flash space. Once the checkpoint is recorded in the log, any previous log entries are no longer needed.

As flash operation continues, both write operations and erase operations are recorded in the log. For write operations, before performing the write, a set of blocks (e.g. up to 10) are allocated for future writes and a log entry is recorded specifying these blocks. Subsequent writes are done to this reserved set of blocks without recording any additional log entries, which greatly reduces the overhead involved in logging. Once the reserved set of blocks specified in the log entry are used up, another set of blocks are allocated and recorded in the log. For erase operations, a log entry is recorded for every erase involved in a compaction to reclaim dirty sectors (this may be extended to store multiple erases in a single log entry to reduce overhead). Periodically, another checkpoint may be performed and once this is done, the previous log entries may be reclaimed to be reused as described in more detail below.

Figure 4:
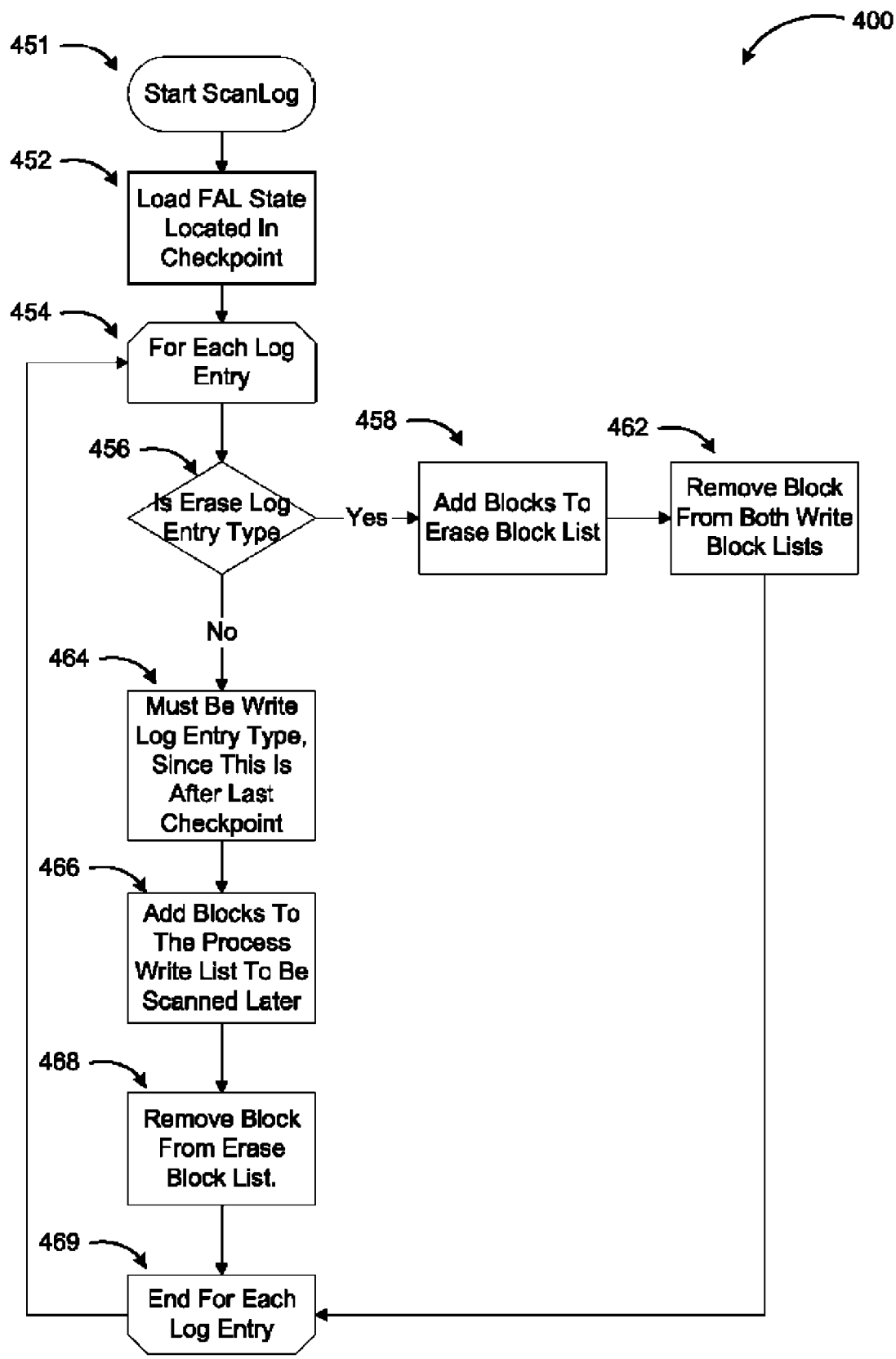
FIG. 4 illustrates an example process for constructing write block list upon recovery in a flash driver according to embodiments.

FIG. 4 illustrates example process 400 for constructing write block list upon recovery in a flash driver according to embodiments. Typically, on a safe shutdown, a checkpoint is performed before the driver unloads. Therefore, when the system boots up again, the flash driver simply has to locate the checkpoint and load the entire flash state into RAM. However, if a power failure happens unexpectedly, then the driver has to process any log entries that were recorded after the latest checkpoint, so that the flash state after boot up is consistent with the state right before the power failure occurred.

Once the log has been located and initialized, the log needs to be processed starting from the latest valid checkpoint. The latest checkpoint has all of the flash state at the time the checkpoint was taken. This is first loaded into RAM to be used as a starting point according to some embodiments. Then, the log is scanned to determine the order in which the blocks were written to. The purpose of scanning the log ahead of time is to eliminate duplicates when blocks are written to, compacted, and written to again. Two write block lists may be constructed: one for the data writes and one for the mapping table writes. In addition, an erase block list may be constructed including the blocks that have been erased. This is used to update the free list properly.

As described briefly above, the write block list construction process begins with scanning of the log (451) and loading of the FAL state from the checkpoint (452), once that is found. Then, a repetitive process is performed for each log entry as shown in the diagram between steps 454 and 469. The repetitive process comprises first a determination of whether the log entry is an ERASE type log entry (456). If the log entry is an ERASE entry, the pointed blocks are added to the erase block list (458) and removed from the data write and mapping table write block lists (462).

On the other hand, if the log entry is not an ERASE type entry, the determination at step 464 is this must be a WRITE type log entry because it is after the last checkpoint. Therefore, the pointed blocks are added to the process write list to be scanned later (466) and removed from the erase block list (468). As mentioned above, this process is repeated for each log entry.

Figure 5:
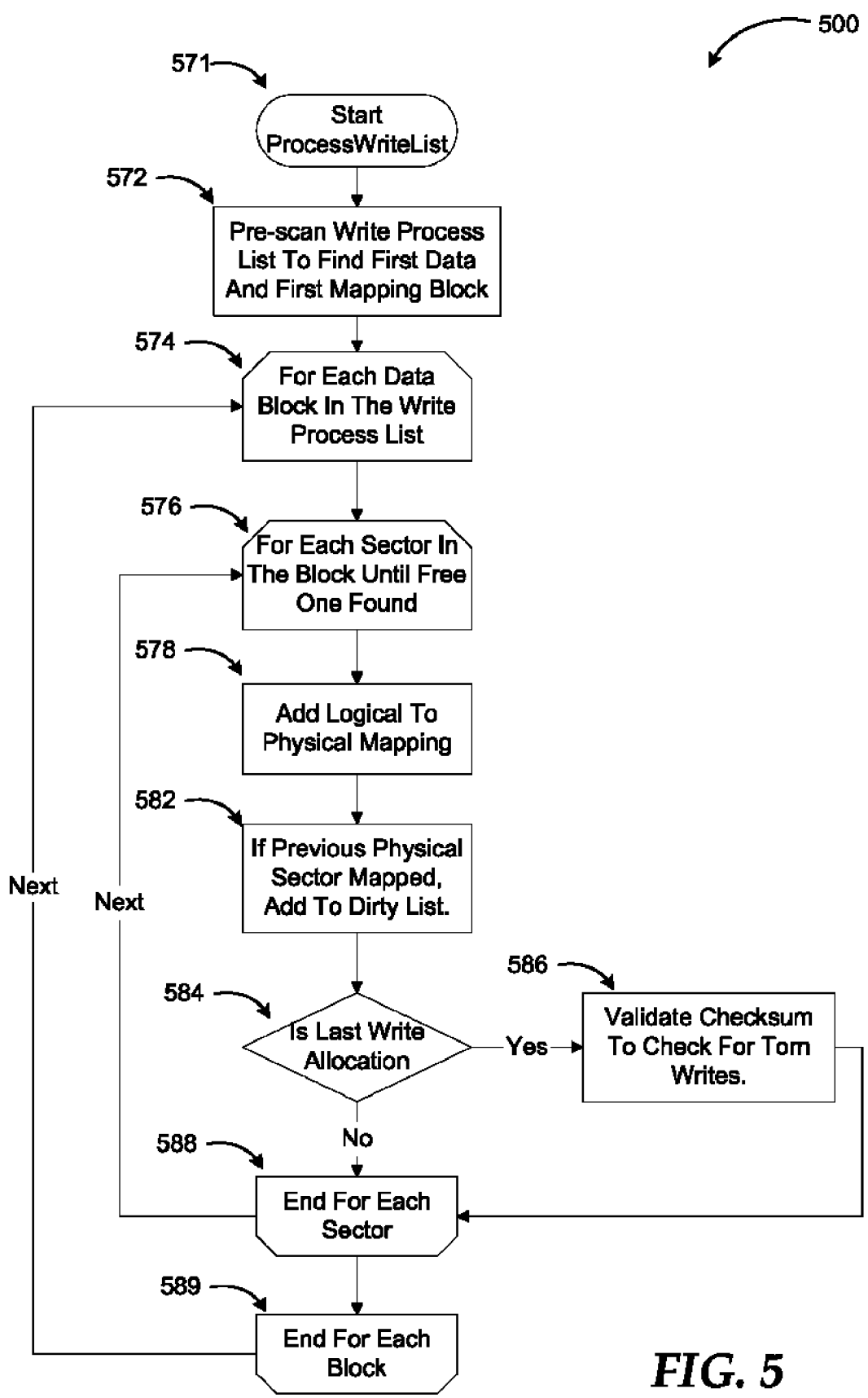
FIG. 5 illustrates an example process for determination of write operation order upon recovery in a flash driver according to embodiments.

FIG. 5 illustrates example process 500 for determination of write operation order upon recovery in a flash driver according to embodiments. Once the write block list is constructed, each block in the write block list may be examined to determine which write operations occurred. This may be performed twice: first for the mapping table blocks, so that all the updated secondary table locations are recorded in the master mapping table, and second for the data blocks.

The process involves scanning through each of the blocks that were written to, and effectively re-performing the operations that happened since the last checkpoint by updating the new logical to physical sector mapping for each location. Once this is complete, each of the blocks in the erase block list may be added to the free block list.

Thus, upon starting of the process (571), the write process list is scanned to find first data and mapping block (572). Then, the above discussed two repetitive processes are performed—for each data block in the write process list (574: 589) and for each sector in each block until a free one is found (576:588). In the repetitive process(es), the new logical to physical sector mapping is added for each location (578) and if a previous physical sector is mapped, it is added to the dirty list (582). After each update operation, a determination is made (584) whether this was the last write allocation. If the operation was the last write allocation, the checksum may be validated for torn writes as described below in more detail (586). Otherwise, the process is repeated for another sector (and eventually for another block).

Once determination of write operation order upon recovery is finished, all of the individual write or erase operations that fully completed have been processed. However, cases where a power failure happens in the middle of an operation need to be addressed as well. This may be handled as follows for each of the operations.

Write operation—If the last log entry is a write entry, then a write operation must be the last operation to occur. Upon recovery, each of the blocks specified in the write log entry may be scanned to determine if there are any torn writes (partially written sectors). The blocks may be scanned sector by sector from the beginning, and the checksum of each sector validated to determine whether the last write operation completed. Once a free sector is found, then the data may be examined to make sure no bits have been set. If any bit has been set, then this is a torn sector write. Once a valid free sector is found, the rest of the sectors in the block may be skipped.

Compaction operation—The compaction operation includes a series of writes to copy valid mapped sectors to a new location, followed by an erase of the old block. The write recovery is handled in the same way as described above. If the last log entry is an erase entry, then the erase may just be repeated since any valid data must have already been copied.

Checkpoint—If the last log entry is a checkpoint entry, then the checksum of the flash state may be validated to determine if the flash state was completely written out. If the flash state is incomplete, then the blocks containing the flash state may be erased and a new flash state may be written out to the same blocks once the log has been scanned.

Figure 6:
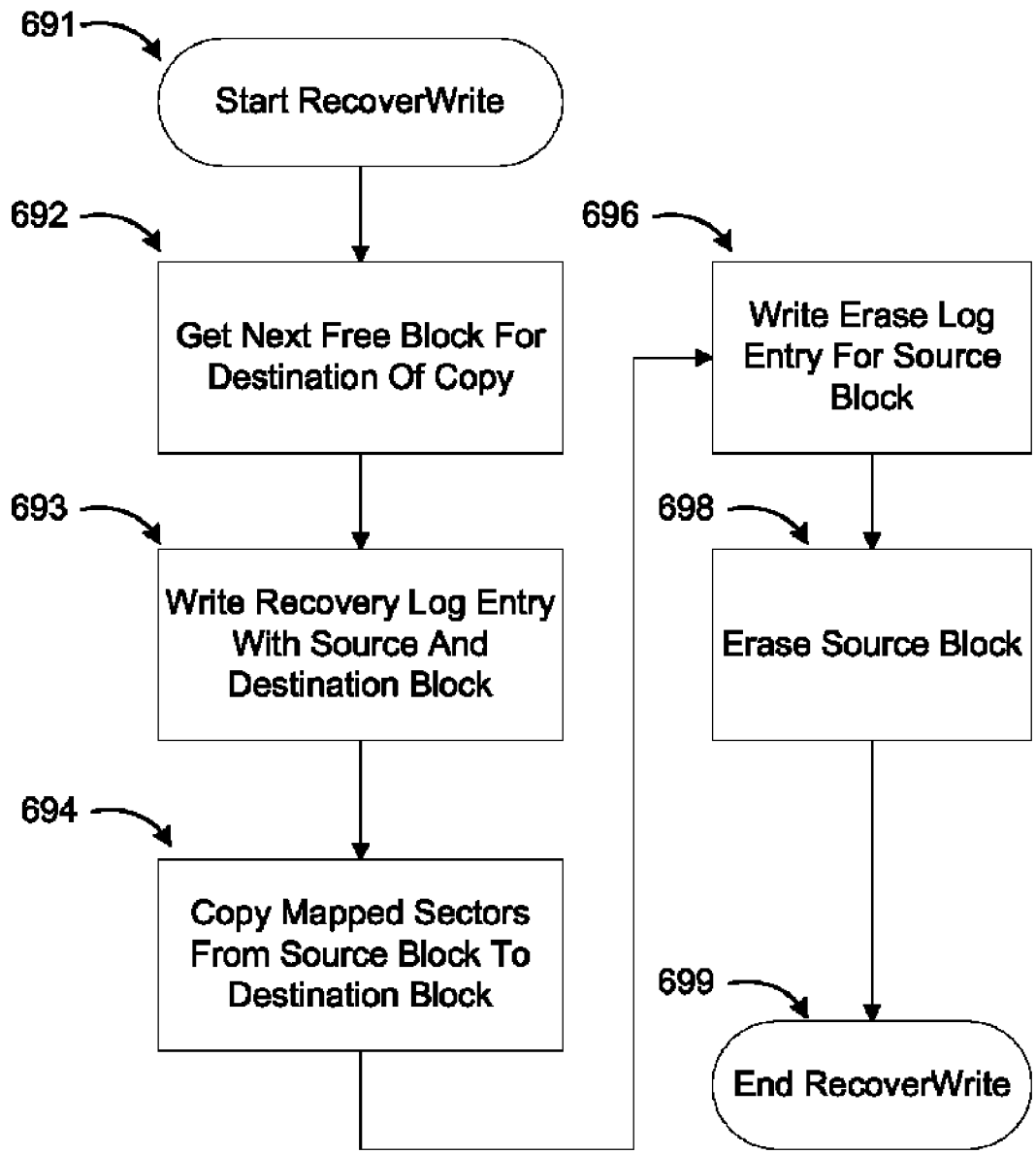
FIG. 6 illustrates an example process for recovering a write operation interrupted by power failure in a flash driver according to embodiments.

FIG. 6 illustrates an example process for recovering a write operation interrupted by power failure in a flash driver according to embodiments. If power is lost during the middle of a write and results in a torn write where the checksum of the data is invalid, then the block containing the write needs to be compacted. In addition, if a write failure occurs during normal operation, then the block containing write failure may need to be compacted in the same manner. In the latter case, the block may be subsequently marked as bad.

The write recovery process starts at operation 691 and a next free block is obtained for destination of copying (692). Then, a recovery log entry is written with source and destination blocks (693) followed by copying of the mapped sectors from the source block to the destination block (694). This is followed by writing of the erase log entry for the source block (696) and erasing of the source block (696) concluding the write recovery process (699).

During the write recovery process, the possibility of another power failure occurring may also be handled by repeating the write recovery process using the same recover write log entry as well as the same source and destination blocks. By reusing the same log entry, writing potentially many log entries is avoided in cases where the system may continually reboot (e.g. repeated power failure, system anomaly, and the like).

As flash operations continue, the log may continue to get larger and at some point need to be trimmed to reuse the blocks. Since there must be at least one checkpoint at any given time in a system according to embodiments, a new checkpoint may have to be written out before any older ones can be deleted. In that case, the log is de-allocated from the beginning so that the linked list structure is preserved. In addition, flash state blocks are de-allocated before the checkpoint log entry, so that the reference(s) to those flash state blocks are not lost. Therefore, an additional state may be required in the driver to perform the de-allocations in the correct order. The de-allocation of a log block simply involves erasing the block.

The exact times when a checkpoint is performed in order to trim the log may depend on a variety of heuristics. Once there is exactly enough free space to perform a checkpoint and there are extra log blocks to be reclaimed, a checkpoint may created in order to prevent the free space from falling below the amount required to create a checkpoint. Moreover, once the log size reaches a certain critical size, a checkpoint may be performed in order to free up space so that the flash data write operations can be performed more optimally. A checkpoint may also be performed periodically when the system CPU goes idle in order to prevent the log size or free space from reaching a critical level.

The operations described above in conjunction with FIG. 3-FIG. 6 are example operations and do not constitute limitations. Flash recovery using a transaction log may be accomplished through other operations with fewer or additional steps and in different orders than those discussed here by adhering to the principles described herein.

Figure 7:
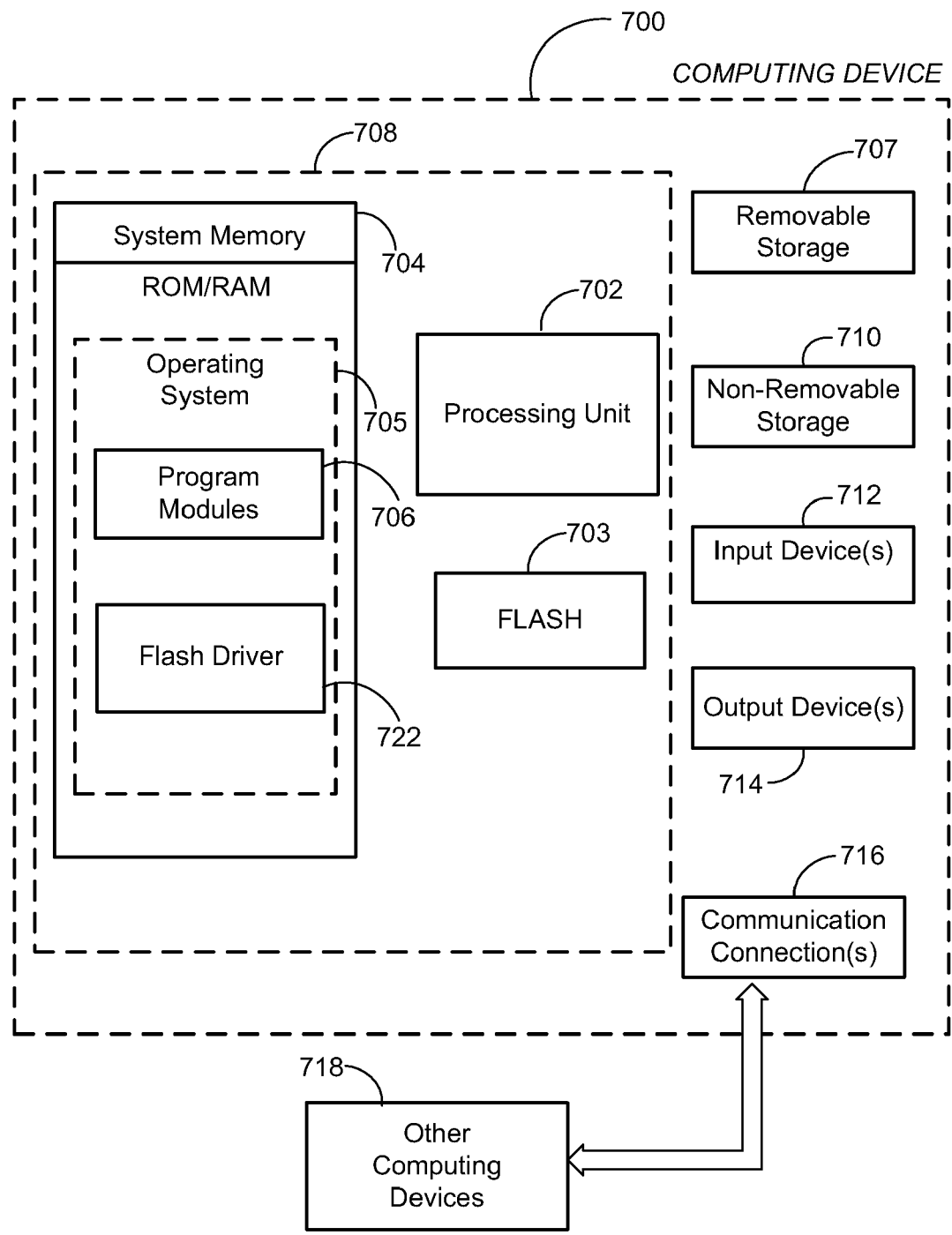
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment is illustrated, such as computing device 700. In a basic configuration, the computing device 700 may be any type of computer capable of using a flash memory and typically include at least one processing unit 702 and system memory 704. Computing device 700 may also include a plurality of processing units that cooperate in executing programs. While shown as a separate module flash memory 703 may be part of system memory 704, removable storage 707, or non-removable storage 710. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the computing device, such as the WINDOWS® operating systems from MICROSOFT CORPORATION of Redmond, Wash. The system memory 704 may also include one or more software applications such as program modules 706 and flash driver 722 for managing the flash memory 703.

Flash driver 722 employs a transaction log to recover flash memory contents. As discussed previously, the transaction log in a system according to embodiments comprises a chained sequence of blocks which specify the operations that have been performed, such as a write to a sector or an erase to a block. Periodically, a checkpoint is performed, where the entire flash state is written out to flash. Once a checkpoint is performed, all of the log entries prior to the checkpoint may be deleted and the log processing on recovery begins with the latest checkpoint. If the system is able to safely shutdown, then a checkpoint may be performed before the driver unloads, and on initialization, the entire persisted flash state may be loaded into the flash memory with a minimal amount of flash scanning. If a power failure occurs during system operation, then on the next boot-up, only the sectors or blocks specified in the log entries after the latest checkpoint have to be scanned, rather than all the sectors on the part. Flash driver 722 may be an integral part of the operating system, a module associated with an application, or a separate application of its own. This basic configuration is illustrated in FIG. 7 by those components within dashed line 708.

The computing device 700 may have additional features or functionality. For example, the computing device 700 may also include additional data storage devices (removable and/or non-removable) such as, for example, magnetic disks, optical disks, tape, or flash memory as mentioned above. Such additional storage is illustrated in FIG. 7 by removable storage 707 and non-removable storage 710. Computer storage media may include volatile and nonvolatile, removable and non-removable media implemented in any method or technology for storage of information, such as computer readable instructions, data structures, program modules, or other data. System memory 704, removable storage 707 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 712 such as keyboard, mouse, pen, voice input device, touch input device, etc. Output device(s) 714 such as a display, speakers, printer, etc. may also be included.

The computing device 700 may also contain communication connections 716 that allow the device to communicate with other computing devices 718, such as over a wireless network in a distributed computing environment, for example, an intranet or the Internet. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. While the presence of a modulated data signal may be transitory in nature, the signal is generated to cause changes in a receiving device, thereby creating physical and tangible changes (effects) during its reception by the receiving device. By way of example, and not limitation, communication media includes wired media such as a wired network or direct-wired connection, and wireless media such as acoustic, RF, infrared and other wireless media.

The claimed subject matter also includes methods as discussed in FIG. 3 through FIG. 6. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for flash memory recovery employing a transaction log, the method comprising:
   during flash memory operations, generating the transaction log comprising a chained sequence of blocks specifying performed flash memory operations;
   performing a checkpoint by writing an entire flash memory state into a specified location in the flash memory;
   upon completing the checkpoint, deleting all transaction log entries, wherein a final checkpoint is performed prior to a flash driver unload during a safe shutdown;
   if the flash memory is initialized following the safe shutdown, loading the entire flash state based on the final checkpoint; and
   if the flash memory is initialized following an unexpected shutdown without performing a complete checkpoint prior to the flash driver unload, recovering the flash memory state by scanning transaction log entries after a last checkpoint.

2. The method of claim 1, wherein each block on the flash memory includes a forward pointer to a next block in the chain and a backwards pointer to a previous block in the chain, wherein each sector within any block stores a single log entry, and wherein the transaction log is stored in an arbitrary location in the flash memory without being pre-reserved to a specific set of blocks.

3. The method of claim 2, wherein each log block is identified by a special log bit in a spare area of the flash memory within each corresponding sector, and each block is scanned from a beginning of the flash memory until a block with the special log bit is found in order to locate the transaction log upon initialization.

4. The method of claim 3, further comprising:
   upon locating the block with the special log bit, locating a remainder of the transaction log by following the forward and backward pointers; and
   locating the last checkpoint by starting at an end of the transaction log and examining each of the log entries backwards until the last checkpoint is found.

5. The method of claim 2, wherein each log entry is of a type comprising one from a set of: a write log entry, an erase log entry, a checkpoint log entry, and a recover write log entry.

6. The method of claim 5, wherein a master mapping table, a dirty block list, and a free block list are flushed upon recording of a checkpoint entry in the transaction log.

7. The method of claim 1, further comprising:
   prior to performing a write operation, allocating a predefined set of blocks for future write operations;
   recording a transaction log entry specifying the allocated set of blocks; and
   performing subsequent write operations to the allocated set of blocks without recording any additional log entries.

8. The method of claim 1, further comprising:
   recording a transaction log entry for every erase operation involved in a compaction to reclaim dirty sectors.

9. The method of claim 1, wherein recovering the flash memory state by scanning transaction log entries after the last checkpoint following an unexpected shutdown comprises:
   locating the transaction log upon initialization;
   determining the last checkpoint entry; and
   constructing a write block list for data writes, a write block list for mapping table writes, and an erase block list for erased blocks subsequent to the last checkpoint.

10. The method of claim 9, wherein constructing the write block list for data writes, the write block list for mapping table writes, and the erase block list for erased blocks comprises:
    re-performing the write operations subsequent to the last checkpoint by updating a new logical to physical sector mapping for each mapping table block and data block; and
    adding all blocks in the erase block list to a free block list.

11. The method of claim 10, further comprising:
    subsequent to each update, determining whether the corresponding write operation is the last write operation;
    if the write operation is the last write operation validating a checksum for detecting partially written sectors; else repeating the update for a subsequent block.

12. The method of claim 1, wherein recovering the flash memory state by scanning transaction log entries after the last checkpoint following an unexpected shutdown further comprises:
    if a last transaction log entry is a checkpoint entry, validating a checksum of the flash state to determine whether the flash state has been completely written prior to the unexpected shutdown; and if the flash state is incomplete, erasing blocks containing the flash state and writing a new flash state may be written to the same blocks once the transaction log is completely scanned.

13. The method of claim 1, wherein recovering the flash memory state by scanning transaction log entries after the last checkpoint following an unexpected shutdown further comprises:
    if a last transaction log entry if an erase operation following a plurality of write operations forming a compaction operation, repeating the erase operation.

14. The method of claim 1, wherein recovering the flash memory state by scanning transaction log entries after the last checkpoint following an unexpected shutdown further comprises:
    if a last transaction log entry if a write operation, examining each of the blocks specified in the write log entry to determine if any partially written sectors exist by scanning the blocks sector by sector from the beginning and validating a checksum of each sector;
    in response to detecting a free sector, examining whether any bits are set, wherein a bit being set indicates a partially written sector; and
    skipping a remainder of the sectors in an examined block, upon validating the detected free sector.

15. The method of claim 1, wherein the checkpoint is performed in response to one of:
    existence of sufficient free space to perform a checkpoint and existence of extra transaction log blocks to be reclaimed in order to prevent the free space from falling below an amount required to perform checkpoint;
    the transaction log reaching a predefined size in order to free available space optimal performance of flash data write operations; and
    a system processor entering an idle state in a periodical manner such that one of the transaction log size and the free space are prevented from reaching a predefined threshold.

16. A computing device capable of flash memory recovery employing a transaction log, comprising:
    a flash memory; and
    a processor coupled to the flash memory arranged to execute:
        a flash driver configured to interact with flash memory hardware, implement programming and erasing algorithms, and implement error correction algorithms;
        a flash abstraction layer configured to process input/output requests from a file system, implement wear-leveling operations, maintain data integrity, and manage recovery following an unexpected shutdown by recovering flash memory state employing the transaction log recorded during regular flash memory operations and a checkpoint reflecting an entire state of the flash memory at a time point prior to the unexpected shutdown; and
        the file system.

17. The computing device of claim 16, wherein the flash abstraction layer includes:
    a main flash abstraction layer object for handling read/write operations in a predefined flash region and for building logical to physical mapping during initialization;
    a sector manager for managing a list of free and dirty sectors in the flash hardware;
    a mapping table for maintaining the logical to physical sector mapping by translating logical sector addresses from the file system into corresponding physical sector addresses on the flash hardware.

18. The computing device of claim 17, wherein the flash abstraction layer further includes:
    a compactor for recycling dirty sectors into free sectors by analyzing each flash block to determine which sectors are dirty and are to be recycled, such that any sectors in the flash block that are not dirty are re-mapped to another portion of the flash hardware.

19. A computer-readable storage medium with instructions stored thereon for flash memory recovery employing a transaction log, the instructions comprising:
    during flash memory operations, generating the transaction log comprising a chained sequence of blocks specifying performed flash memory operations;
    performing a checkpoint by writing an entire flash memory state into a specified location in the flash memory;
    upon completing the checkpoint, deleting all transaction log entries, wherein a final checkpoint is performed prior to a flash driver unload during a safe shutdown;
    if the flash memory is initialized following the safe shutdown, loading the entire flash state based on the final checkpoint; and
    if the flash memory is initialized following an unexpected shutdown without performing a complete checkpoint prior to the flash driver unload, recovering the flash memory state by:
        scanning each block from a beginning of the flash memory until a block with a special log bit is found in order to locate the transaction log, wherein each log block is identified by the special log bit in a spare area of the flash memory within each corresponding sector;
        upon locating the block with the special log bit, locating a remainder of the transaction log by following forward and backward pointers in each block of the transaction log; and
        locating a last checkpoint by starting at an end of the transaction log and examining each log entry backwards until the last checkpoint is found.

20. The computer-readable storage medium of claim 19, wherein instructions further comprise:
    when a new checkpoint is to be performed while another exists, de-allocating the transaction log before a checkpoint log entry from the beginning such that a linked list structure of the transaction log is preserved.

* * * * *